April 17, 1956     W. C. SEALEY     2,742,255

HINGED VALVE WITH LOST MOTION FLAP MOUNTING

Filed Sept. 15, 1952     2 Sheets-Sheet 1

Inventor
William C. Sealey
by Didier Journeaux
Attorney

United States Patent Office 2,742,255
Patented Apr. 17, 1956

2,742,255

HINGED VALVE WITH LOST MOTION FLAP MOUNTING

William C. Sealey, Wauwatosa, Wis., assignor to Allis-Chalmers Manufacturing Company, Milwaukee, Wis.

Application September 15, 1952, Serial No. 309,579

5 Claims. (Cl. 251—85)

This invention relates in general to valve assemblies and particularly to an improved valve assembly having a compact housing with a relatively large valve seat aperture.

In valves of the hinged flap type it is desirable that the valve disk close on the seat without the valve disk dragging on the valve seat. In some prior art valve assemblies to obtain this result, the axis of the shaft which actuated the valve disk was disposed substantially in the same plane as the valve seat and outside the path of the fluid. This construction was necessary whenever the valve disk was in a fixed relation to the actuating arm and shaft which rotated it. The housing of such an assembly was necessarily large relative to the aperture in the valve seat to accommodate the valve seat and shaft in the same plane and therefore the housing could not be adapted to an assembly which required a number of independently operated valves in close proximity to each other or in an assembly where the mounting space was otherwise limited.

To reduce the size of the housing the actuating shaft was moved into the path of the fluid stream and out of the plane of the valve seat. This construction has the disadvantage that the heel of the valve disk drags on the valve seat when the valve is being closed. This dragging occurs because the heel follows a substantially circular path tangent to the valve seat while the toe approaches the valve seat to fully close the valve. If the valve disk is not rigidly mounted to the actuating arm and the axis of the actuating shaft lies outside of the plane of the valve seat, it is possible to obviate the dragging action of the heel by biasing the valve disk so that it pivots about the toe or heel of the disk when the valve is nearly closed. The use of a flexible element for mounting the valve disk on the actuating arm will accomplish this but has the disadvantage that the valve will not open or close if the flexible element is rendered inoperative.

In accordance with this invention, the above mentioned disadvantages have been obviated by providing in a valve assembly a positive linkage for effecting movement of the valve disk by an actuating shaft disposed within the fluid stream, and a biasing means for tilting the valve disk with respect to the actuating arm to a predetermined position, the biasing means cooperating with the positive linkage to cause a quasi lost motion movement when the disk contacts the seat so that the disk and seat will not slide in relation to each other.

It is therefore an object of the present invention to provide an improved hinged flap valve assembly having the largest aperture possible in the valve seat while maintaining the valve housing relatively small so that it may be utilized in an assembly where mounting space is limited.

Another object of the present invention is to provide an improved valve assembly in which the axis of the actuating shaft about which the valve disk is rotated lies within the path of the fluid so that the dimensions of the valve housing may be reduced as much as possible.

A further object of the present invention is to provide an improved valve assembly in which the toe of the valve disk contacts the valve seat before the heel, thereby preventing the heel from dragging on the valve seat.

A still further object of my invention is to provide an improved valve assembly having a biased valve disk which remains operative in the event that the biasing means is rendered inoperative.

Objects and advantages other than those set forth above will be apparent from the following description when read in connection with the accompanying drawings, in which.

Figure 3:
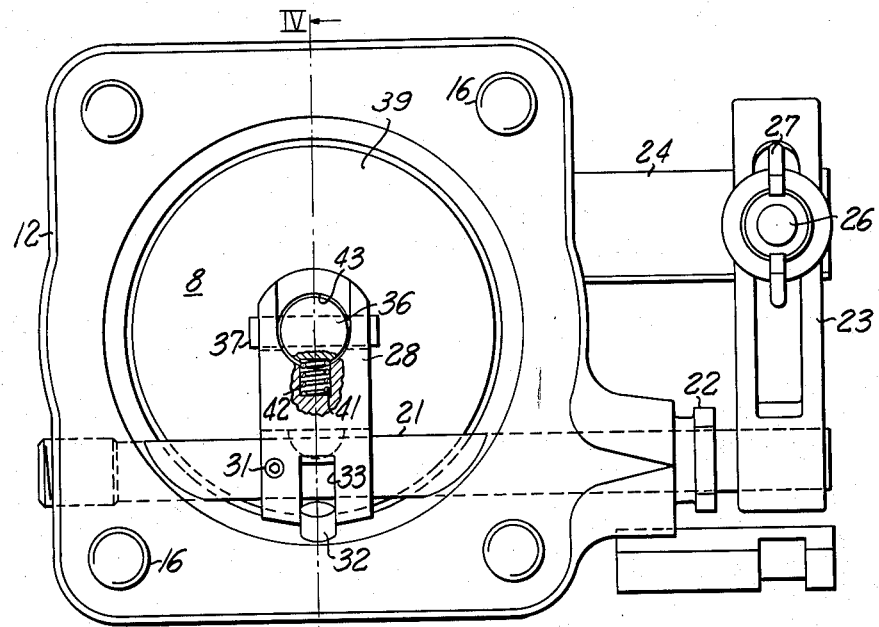
Fig. 3 is a front view of the valve assembly in the closed position.
Figures 1, 2:
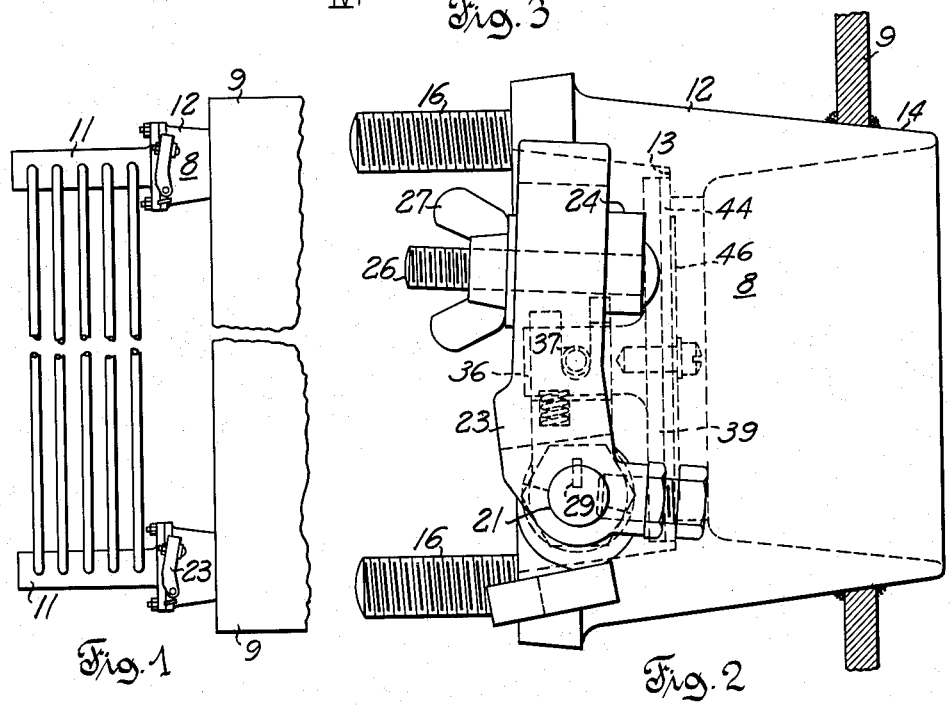
Fig. 1 is a side view of the valve assembly shown joining a transformer casing and a radiator.
Fig. 2 is an enlarged side view of the valve assembly of Fig. 1.

Referring to the drawings, the valve assembly 8 is shown positioned between a transformer casing 9 and a radiator 11. Valve housing 12 has a valve seat 13 machined into it and is welded at one end 14 into the transformer casing as shown in Fig. 2. The other end of the assembly is provided with studs 16 for attaching the radiator. The valve seat has a circular edge 18 disposed in a transverse plane to define an aperture 19 for the flow of fluid through the valve assembly. An actuating shaft 21 is pivotally mounted in the housing and has an extension through a stuffing gland 22 to the outside of the housing and has a locking arm 23 rigidly attached to it.

The axis of shaft 21 is parallel to the plane of edge 18. To permit a reduction in the size of the housing, shaft 21 is disposed in the fluid stream, the projection of the axis of the shaft on the plane of edge 18 intersecting the edge.

The locking arm 23 may be bolted to a stop 24 by means of a bolt 26 and a wing nut 27 when the valve is completely closed. Actuating arm 28 is rigidly attached to the actuating shaft 21 by means of a key 29. A set screw 31 aids in maintaining this position. A lock pin 32 inserted in housing 12 penetrates a slot 33 in arm 28 to prevent axial movement of arm 28 and of shaft 21. The actuating arm has a cylindrical recess 34 in which the valve stem 36 is positioned engaging the sides of the recess with a loose fit. The valve stem is locked in the recess by a pin 37 which may have a loose fit or a sliding fit on the stem and on the arm but may be mounted rigidly on either the arm or the stem. The drawing shows this pin 37 consisting of a resilient split tube which is forced into a bore of valve stem 36 so as to be rigidly attached to the valve stem 36 with the axis of the pin disposed ninety degrees to the axis of symmetry of the stem. The ends of the pin engage the sides of a slot shaped recess 38 in arm 28 with a loose or a sliding fit, thereby limiting the movement of the valve disk 39 with respect to the arm 28. Pin 37 has its axis parallel to the pivotal axis of shaft 21 and supports the valve disk 39 when the valve is open.

Means for tilting the valve disk 39 with respect to arm 28 comprise a spring 41 in operative contact with the arm and with either valve stem 36 or pin 37. The spring preferably is a coil compression spring 41 partially disposed in a recess 42 with one end abutting the bottom of the recess and the other end abutting the portion of the stem extending beyond the pin 37. The axis of spring 41 is substantially normal to the axis of pin 37 and to the axis of symmetry of stem 36. When the valve is open the spring forces the stem to be pivoted about the axis of the pin until it abuts the edge 43 formed by the intersection of recess 34 and recess 38.

If desired, gasket material may be provided for either on the valve disk or the valve seat. In the embodiment shown, gasket material 44 is attached to the valve disk 39 by means of a washer 46 and a bolt 47.

Figure 4:
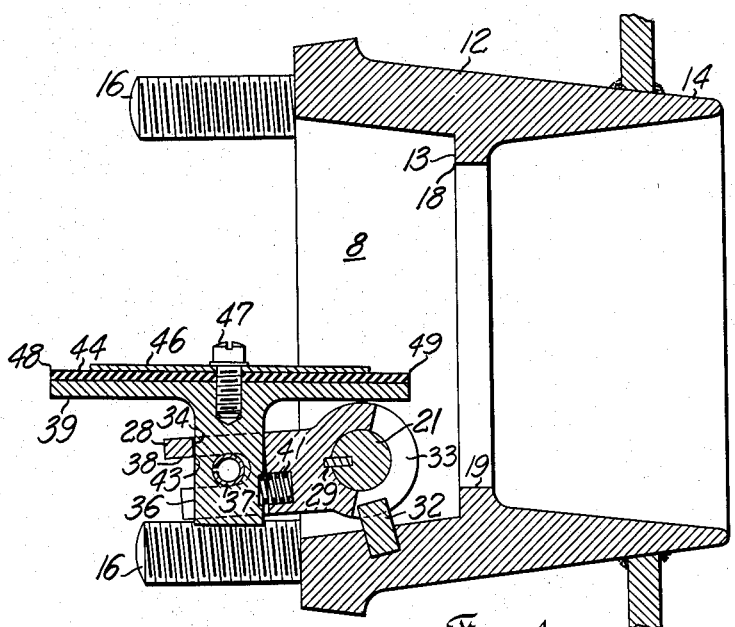
Fig. 4 is a sectional view taken along the line IV—IV of Fig. 3 showing the valve in the open position.
Figure 5:
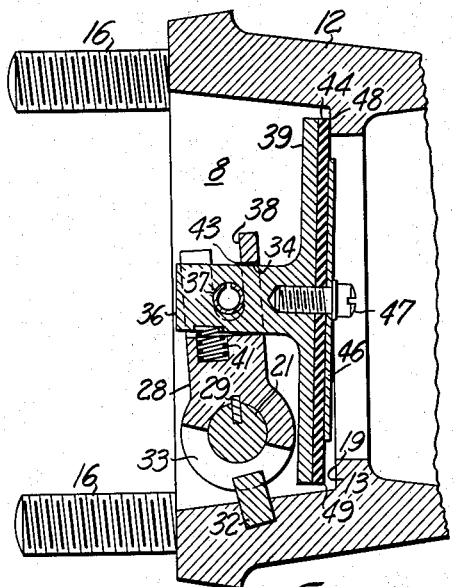
Fig. 5 is a view similar to Fig. 4 showing the valve in an intermediate position.
Figure 6:
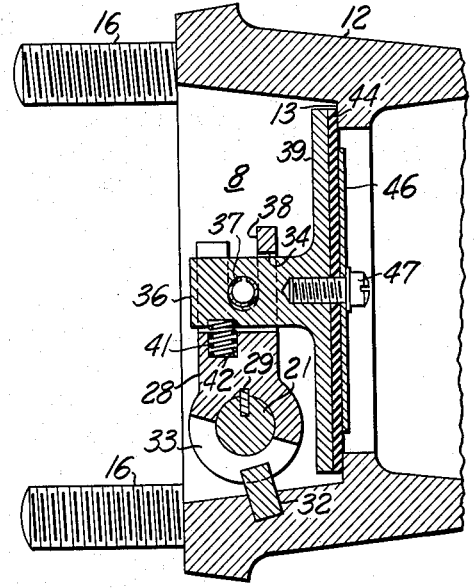
Fig. 6 is a view similar to Fig. 4 showing the valve in the closed position.

The valve being open as shown in Fig. 4, to close the valve the actuating shaft 21 is rotated clockwise by means of the locking arm 23. The valve disk is rotated about the axis of the actuating shaft until the toe 48 of the valve disk comes in contact with the valve seat as shown in Fig. 5. Because of the friction developed between the toe and the seat the toe does not slide on the seat and the valve disk pivots about the point of contact until the valve is closed as shown in Fig. 6. The valve disk pivoting about the toe causes the pin 37 to slide radially with respect to shaft 21 in the recess 38 compressing spring 41 until the stem assumes a position ninety degrees to the plane of the valve seat and to the actuating arm, which are now parallel. The valve disk does not rub or drag on the valve seat as it would if it were pivoted at a fixed point of the actuating arm.

In opening the valve, the reverse operation occurs. The actuating arm rotates counterclockwise, as shown. The heel 49 of the valve disk is lifted off the seat first by spring 41 causing the valve disk to tilt, and the disk pivots clockwise at the toe until out of contact with the seat.

In the event that spring 41 forming the tilting means breaks or becomes inoperative, the valve will still open and close because the stem remains attached to the actuating arm by pin 37.

This valve assembly provides for a valve seat with a large aperture in relation to the housing, and a valve disk which will not drag on the valve seat during closing.

Although but one embodiment of the present invention has been shown and described, it will be understood that changes and modifications may be made therein without departing from the spirit of the invention or from the scope of the appended claims.

It is claimed and desired to secure by Letters Patent:

1. A valve assembly comprising a housing, a valve seat disposed in said housing, a valve disk, and means for positioning said disk on said seat including a shaft rotatably mounted in said housing, an arm member attached to said shaft, a stem member attached to said disk, means connecting said members together to cause said disk to be moved relative to said seat with rotation of said shaft, means for rotating said shaft, and biasing means urging said disk to a first position with respect to said arm member to cause an edge portion of said disk on rotation of said shaft to first engage said seat, one of said members being provided with an elongated recess, the projection of the axis of said recess on the plane of said disk being substantially parallel to a reference line interconnecting said edge portion and the center of said disk, said connecting means comprising a connecting element disposed in sliding engagement in said recess and fixedly attached to the other of said members, said connecting means and said biasing means providing for pivotal movement of said disk from said first position on further rotation of said shaft after initial engagement of said disk with said seat causing said disk to pivot about said edge portion and causing said element to slide in said recess to position said disk firmly on said seat without said disk dragging on said seat.

2. A valve assembly comprising a housing, a valve seat disposed in said housing, a valve disk, and means for positioning said disk on said seat including a shaft rotatably mounted in said housing, an arm member attached to said shaft, a stem member attached to said disk, means connecting said members together to cause said disk to be moved relative to said seat with rotation of said shaft, biasing means urging said disk to a first position with respect to said arm member; said shaft, said arm member, said disk in said first position, and said seat being disposed with respect to each other to cause said disk on initially engaging said seat to be tilted with respect to said seat, one of said members being provided with an elongated recess, said connecting means comprising a pin element disposed in sliding engagement in said recess and firmly attached to the other of said members, and means for rotating said shaft causing an edge portion of said disk to first engage said seat, the projection of the axis of said recess on the plane of said disk being substantially parallel to a reference line interconnecting said edge portion and the center of said disk, said connecting means and said biasing means providing for pivotal movement of said disk from said first position on further rotation of said shaft after initial engagement of said edge portion with said seat causing said disk to pivot about said edge portion and causing said pin element to slide in said recess to position said disk firmly on said seat without said disk dragging on said seat.

3. A valve assembly comprising a housing, a valve seat defining an opening for the flow of fluid through said housing, a valve disk, and means for positioning said disk on said seat including a shaft rotatably mounted in said housing, an arm member attached to said shaft, a stem element attached to said disk; said shaft, said arm member, said seat, and said disk in a first position being disposed with respect to each other to cause said disk on initially engaging said seat to be tilted with respect to said seat, means connecting said arm member to said stem element to cause said disk to be moved relative to said seat with rotation of said shaft, said arm member being provided with an elongated recess, said connecting means comprising a pin element disposed in sliding engagement in said recess and fixedly attached to said stem element, means for rotating said shaft, and biasing means acting between said arm member and one of said elements urging said valve disk to said first position with respect to said arm member during rotation of said shaft until an edge portion of said disk initially engages said seat, the projection of the axis of said recess on the plane of said disk being substantially parallel to a reference line interconnecting said edge portion and the center of said disk, said connecting means and said biasing means providing for pivotal movement of said disk from said tilted position on further rotation of said shaft after initial engagement of said edge portion with said seat causing said disk to pivot about said edge portion and causing said pin element to slide in said recess to position said disk firmly on said seat without said disk dragging on said seat.

4. A valve assembly comprising a housing, a valve seat disposed in said housing, said seat having a circular edge in a plane to define an opening for the flow of fluid through said assembly, a valve disk, and means for positioning said disk on said seat including a shaft rotatably mounted in said housing with the axis of said shaft parallel to said plane and disposed so that the projection of the axis of said shaft on said plane intersects said circular edge, an arm member attached to said shaft and extending radially therefrom, a stem element attached to said disk with the axis of symmetry of said stem member disposed normal to the face of said disk, means connecting said members together to cause said disk to be moved relative to said seat with rotation of said shaft, biasing means for urging said valve disk to a first position with respect to said arm member; said disk in said first position, said shaft, said arm member, and said seat being disposed with respect to each other to cause said disk on initially engaging said seat to be tilted with respect to said seat, said arm member being provided with an elongated recess extending radially from said shaft, said connecting means comprising a pin element disposed in said recess and fixedly attached to said stem member with the axis of symmetry of said pin element disposed normal to said axis of symmetry of said stem element and parallel to said shaft, and means for rotating said shaft to cause an edge portion of said disk to initially engage said seat, the projection of the axis of said recess on the plane of said disk being substantially parallel to a reference line interconnecting said edge portion and the center of said disk, said connecting means and said biasing means providing for pivotal movement of said disk from said first position on further rotation of said shaft after initial engagement of said disk with said seat causing said disk to pivot about said edge portion and causing said pin element to slide in said recess to position said disk firmly on said seat without said disk dragging on said seat.

5. A valve assembly comprising a housing, a valve seat, said seat having a circular edge in a plane to define an opening for the flow of fluid through said valve assembly, a valve disk, and means for positioning said disk on said seat including a shaft rotatably mounted in said housing with the axis of said shaft parallel to said plane and disposed so that the projection of said axis on said plane intersects said circular edge, an arm member attached to said shaft and extending radially therefrom, said arm member being disposed substantially parallel to said plane when said disk is positioned on said seat, a stem element attached to said disk, means connecting said arm member to said stem element to cause said disk to be moved relative to said seat with rotation of said shaft, said arm member including an elongated recess extending radially with respect to said shaft, said connecting means comprising a pin element disposed in sliding engagement in said recess and fixedly attached to said stem element with the axis of said pin element being disposed parallel to the axis of said shaft, means for rotating said shaft, and biasing means comprising a spring acting between said arm member and said stem element urging said valve disk to a tilted position with respect to said arm member during rotation of said shaft until an edge portion of said disk initially engages said seat, the projection of the axis of said recess on the plane of said disk being substantially coincident with a reference line disposed in said last mentioned plane and extending from said edge portion through said axis of symmetry of said stem element, said connecting means and said biasing means providing for pivotal movement of said disk from said tilted position on further rotation of said shaft after initial engagement of said disk with said seat causing said disk to pivot about said edge portion and causing said pin element to slide in said recess to position said disk firmly on said seat without said disk dragging on said seat.

References Cited in the file of this patent

UNITED STATES PATENTS

| | | |
|---|---|---|
| 932,494 | Reeves | Aug. 31, 1909 |
| 1,504,288 | Vencl | Aug. 12, 1924 |
| 1,626,494 | Akers | Apr. 26, 1927 |
| 2,610,822 | Lemos | Sept. 16, 1952 |
| 2,710,163 | Mueller | June 7, 1955 |